March 11, 1947. P. L. SPENCER Re. 22,851

STEM FOR ELECTRICAL SPACE DISCHARGE DEVICES

Original Filed July 25, 1939

INVENTOR
PERCY L. SPENCER
BY Elmer J. Gorn
ATTY.

Reissued Mar. 11, 1947

Re. 22,851

UNITED STATES PATENT OFFICE 22,851

STEM FOR ELECTRICAL SPACE DISCHARGE DEVICES

Percy L. Spencer, West Newton, Mass., assignor, by mesne assignments, to Raytheon Manufacturing Company, a corporation of Delaware Original No. 2,291,660, dated August 4, 1942, Serial No. 286,367, July 25, 1939. Application for reissue October 18, 1944, Serial No. 559,304

3 Claims. (Cl. 49—92.5)

This invention relates to stems for electrical space discharge devices, and more particularly to a novel seal construction for such stems.

Attempts have been made to produce electron discharge tubes with glass envelopes in which the stem serves as the tube base itself, and which carries lead-in conductors which also serve as the external contact pins. Difficulties have been encountered in making the seals at the lead-in conductors strong enough to withstand the strains which occur during the use of said lead-in conductors as external contact pins resulting in excessive cracking and breaking of said stems.

An object of this invention is to devise a seal construction for such a stem which is sufficiently strong to withstand such strains without cracking.

Another object is to devise such a construction which is simple and inexpensive to manufacture.

The foregoing and other objects of this invention will be best understood from the following description of exemplifications thereof, reference being had to the accompanying drawing, wherein.

Figure 1:
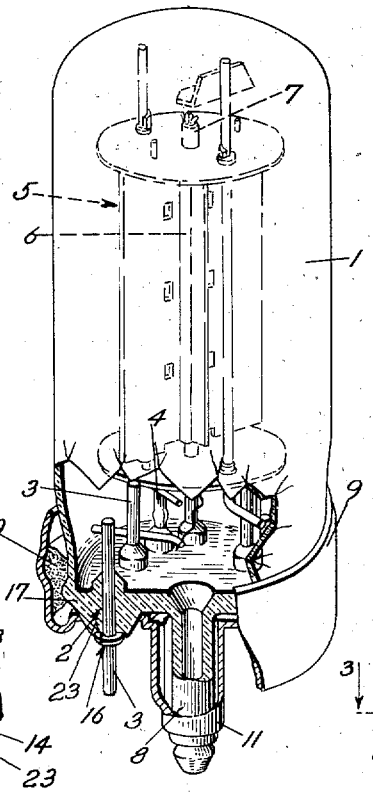
Fig. 1 is a perspective view partly broken away of an electron discharge tube incorporating my novel stem.
Figure 3:
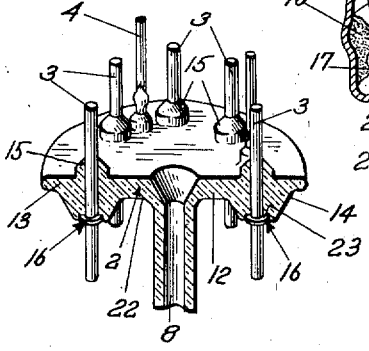
Fig. 3 is a cross-section taken along line 3—3 of Fig. 2.
Figure 2:
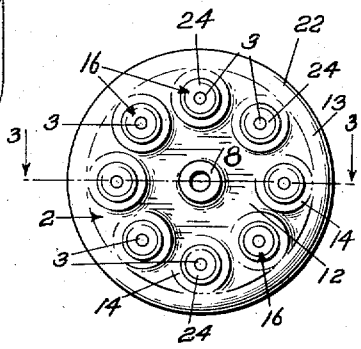
Fig. 2 is a bottom view of a stem made in accordance with the present invention.

The tube as illustrated in Fig. 1 consists of a glass envelope 1 having a bottom wall consisting of a stem or base 2. A plurality of lead-in rods or conductors 3 are sealed through said stem 2. These lead-in rods or conductors are made of some metal which readily seals to the glass of said stem, and may conveniently be made of chrome iron. The lead-in rods or conductors 3 are disposed in a circle concentric with the center of the stem 2. These lead-in rods or conductors are also rigid so that in the completed form of the tube they serve as the external contact pins adapted to be inserted into a cooperating tube socket. If desired a number of dummy support wires 4 may likewise be sealed into the upper surface of the stem 2. These dummy support wires do not extend through the stem, and therefore need not form an air-tight seal therewith. For this purpose these dummy support wires may be made of a metal which does not make a perfect seal with the glass. They may conveniently be formed of nickel. The usual type of mount 5 is supported by the lead-in rods 3 and the dummy support wires 4. The mount 5 may consist of a plurality of electrodes, for example, an anode 6 surrounding a cathode 7. In order to enable the tube to be exhausted, the stem 2 is provided at its central portion with an exhaust opening communicating with an exhaust tube 8. The bottom of the tube is surrounded by a guard shell 9 held in place on the tube by means of a ring of cement 10. The guard shell 9 is provided with a central tubular member 11 which surrounds and protects the portion of the exhaust tube remaining on the completed tube. The guard shell 9 is provided with sufficiently large openings around each of the lead-in rods 3 so that electrical contact between the shell 9 and the rods 3 is effectively prevented.

The tube, as illustrated in Fig. 1, is adapted to be inserted in a suitable tube socket, the tubular member 11 cooperating with some suitable locking arrangement, and the pins 3 cooperating with suitable contact members in said socket, whereby the proper electrical connections may be made to the electrode elements within the envelope 1.

The stem 2 before it is sealed to the envelope 1 may consist of a substantially flat disk or wall member of glass having a central thickened portion 12 into which the lead-in rods 3 and the dummy support wires 4 are sealed. This thickened portion must be sufficiently strong to withstand atmospheric pressure exerted on its lower flat surface upon completion of the tube. It must also be thick enough to firmly and definitely support the lead-in rods 3 and the dummy wires 4 without cracking. It also must be sufficiently massive so that during the sealing of the stem to the envelope 1, it is not heated sufficiently to soften to any appreciable extent. Surrounding the thickened portion 12 is a thinned edge 13. This thinned edge 13 must have a thickness sufficiently less than that of the central portion 12, so that during the sealing-in process it can soften sufficiently to seal readily to the glass envelope 1 without producing any appreciable softening of the central portion 12. The stem 2 is preferably formed with a raised boss 14 provided on the outer surface 22 of said stem around each lead-in rod or conductor 3, and a smaller upper boss 15 around each of said lead-in rods. The bosses 14 project through the openings in the guard shell 9, and thus maintain said guard shell in its proper position as well as insure against electrical contact between said guard shell and the lead-in rods.

When a construction such as described above is made with the lead-in rods 3 having straight sides extending throughout the length of said rod, difficulties have been encountered in preventing cracking of the seals. When tubes having such straight-sided rods were inserted in tube sockets, slight misalignment of said sockets would cause lateral thrusts against the external portions of the lead-in rods. This would result in fine cracks running along the lead-in rod from the exterior of the tube to the interior thereof, so that air would leak into the tube and terminate its useful life. In some instances the cracking is more severe so as to result in a complete breakage of the stem.

Figure 4:
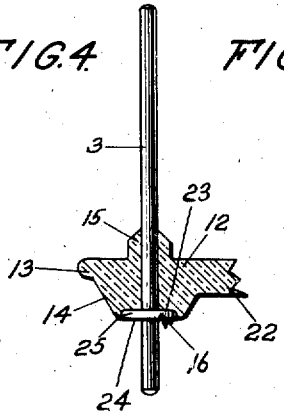
Fig. 4 is an enlarged section of a portion of the stem at one of the lead-in rods.

In accordance with my invention I have discovered that if the external portion of the lead-in rod or conductor 3 is provided with an annular disk portion or flat annular member 16 bearing against the outer end of the boss 14 and preferably sealed thereto, the above defects are eliminated. The flat annular member 16 has a top face 23 and a bottom face 24, both of which extend substantially at right angles to the outer surface of the external portion of the lead-in conductor 3, said top and bottom faces being joined by an edge face 25 which is substantially at right angles to said top and bottom faces. When the lead-in rods or conductors 3 are formed of chrome iron, they are first oxidized so as to have a thin oxide coating on their external surface. This oxidation includes the surface of the disk 16. The glass of the stem 2 is then raised to substantially its melting point and molded around the lead-in rods 3 and said stem formed preferably in accordance with the copending applications of Clarence A. Horn, Serial No. 258,263, filed February 24, 1939, now Patent No. 2,310,237, dated Feb. 9, 1943, and Serial No. 269,871, filed April 25, 1939, now Patent No. 2,321,600, dated June 15, 1943, in which the construction of the stem itself and the method of making it are more fully described and claimed. In this way the glass of the stem 2 is sealed to the rod 3 throughout the entire length of said rod within the glass of the stem, and said glass is also sealed to the top face 23 of member 16 throughout substantially its entire extent. As shown more clearly in Fig. 4, the glass of the lower boss 14 may extend around and be sealed to the edge face 25 of member 16, the bottom face 24 of said member lying beyond the glass of the outer end of boss 14. After said stem has been made, it is sealed to the envelope 1 at the sealing point 17, as more fully described and claimed in said copending Horn applications.

It has been found that seals between metal and glass are relatively poor in tensile strength as compared with their strength in other directions. Therefore, the metal tends to pull away from the glass rather readily if a force is exerted at right angles to the plane of sealing. It is probably due to this weakness that sealing arrangements which do not incorporate the present invention have been found to have a tendency to crack. However, glass-to-metal seals possess relatively great resistance to destruction when forces are exerted parallel to the plane of sealing. In the arrangement according to the present invention, each lead-in rod has sealing surfaces between the metal and the glass, which surfaces are at right angles to each other. Therefore, any force exerted upon the exposed ends of the lead-in rods 3 will have a major component thereof distributed parallel to a sealing plane, and thus in the direction in which the seal possesses its greatest strength. Greatly increased strength of my seal may also be due to other properties thereof. The annular disk 16 might also serve as abutments to distribute forces exerted on the lead-in rods in compressive arrangement against the ends of the bosses 14. Any side thrusts against the ends of the lead-in rods 3 tend to tilt the disk 16. Since, however, this tilting action cannot take place, at least one side of the disk 16 will exert compression against the outer end of the boss 14. Since the compressive strength of glass is very great, such thrusts are readily withstood. The provision of the annular disk 16 also performs another function. Any bending strain exerted on the exposed ends of the rods 3 will cause bending and metal flow thereof, thus distorting these rods. In absence of the disk 16, such distortion could readily extend up into the glass seal, starting a crack which would cause air to leak into the tube. However, the disk 16 limits the extent of such metal flow and distortion. Such metal flow and distortion can no longer extend up into the glass seal, and therefore this source of weakness is eliminated.

Figure 5:
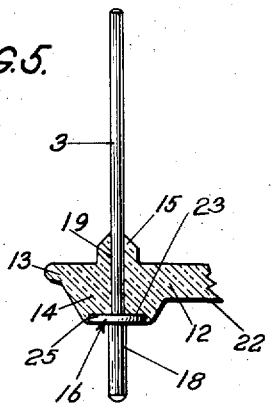
Figs. 5 and 6 are views similar to Fig. 4 of additional embodiments of my invention.

In the embodiment illustrated in Figs. 1 to 4, inclusive, the entire length of the lead-in rod 3, with the exception of the disk 16, is shown to be of uniform diameter. Therefore the portion of said lead-in rod which extends into the interior of the tube has the same degree of rigidity which the external portion possesses. Since this external portion must serve as an external contact prong, such rigidity is fairly great. However, my invention can be applied to arrangements in which the portion of the lead-in rod inside the tube is of a different diameter than the external portion thereof, as, for example, is shown in Fig. 5. In this figure the lower portion 18 of the lead-in rod 3 is of sufficient diameter to possess the requisite rigidity to serve its function as an external contact pin. However, the upper portion 19 of said rod may be of sufficiently smaller diameter to impart thereto an added degree of flexibility. Thus the portion of the rod which extends into the interior of the envelope may be sufficiently small to be bent into a desired position. For example, the portion 19 may have a diameter of half the external portion 18. As indicated, this decreased diameter may extend within the glass of the stem. The fact that the portion of this lead-in rod 3 within the tube is smaller and can bend more readily enables such interior portion to bend before a cracking stress is exerted upon the upper glass boss 15.

One way of constructing such an arrangement as shown in Fig. 5 is to weld the portion 19 to the portion 18 which carries the annular disk 16. In the case of chrome iron such welding is made with the metal in the unoxidized state, whereupon the entire unit may be oxidized as described above.

Instead of making the entire lead-in construction of one metal, different metals may be used. For example, the portion 19 of Fig. 5 may be made of a nickel-iron alloy, while the portion 18 and the annular disk 16 may be made of chrome iron. In this arrangement, if desired the iron-nickel alloy portion 19 may not be oxidized. This can be accomplished inasmuch as oxide can be removed from nickel-iron alloy much more readily than from chrome iron so that upon oxidizing the portions 18 and 16 the oxide may be removed from the portion 19 without removing it from the portions 16 and 18.

Figure 6:
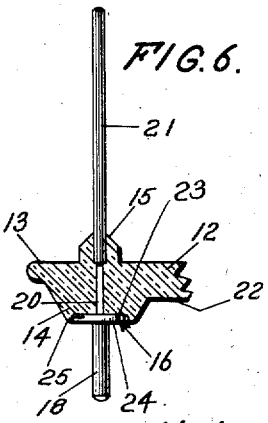

Instead of relying upon the disk 16 as well as the portion extending through the glass to provide the hermetic seal, such function may be assigned to but part of the sealing arrangement, as, for example, is shown in Fig. 6. In this figure the portions 18 and 15 may be formed of any metal, such as chrome iron, to which may be welded a relatively short length 20 of a sealing metal, such as copper-clad iron-nickel wire which is known as "Dumet." To the short length 20 of sealing wire, an additional conductor 21 of a metal, such as nickel or nickel-iron alloy, may be welded. In this case the conductor 21 may be of reduced diameter so as to provide for easy bending thereof as described in connection with Fig. 5. Since in Fig. 6 the length 20 provides for a hermetic seal between the lead-in construction and the glass, no particular precautions need be adopted to cause the inner face of the disk 16 to be sealed to the glass. For this reason the metal of the disk 16 and the outer end 19 need not be oxidized before the sealing operation takes place. If the disk 16 is not sealed to the glass, it nevertheless accomplishes the function of serving as an abutment to distribute forces exerted on the section 18 so that they are exerted as compression forces at the end of the boss 14. Likewise the disk 16 also performs the function of limiting the extent of metal flow and deformation which may occur upon bending of the section 18.

Of course it is to be understood that this invention is not limited to the particular details as described above as many equivalents will suggest themselves to those skilled in the art. For example, several modifications of my novel seal have been described above. Other modifications and variations are likewise impressed within the scope of my invention.

What is claimed is:

1. A stem for an electrical space discharge device comprising a glass wall member having a raised boss formed on its outer surface, a metal lead-in conductor sealed through said glass member and said boss, said lead-in conductor having a rod-like external portion, and a flat annular member formed on said external portion, said annular member having top and bottom faces extending substantially at right angles to the outer surface of said external portion, said top and bottom faces being joined by an edge face of said annular member substantially at right angles to said top and bottom faces, the glass of the outer end of said boss being sealed to said top face throughout substantially its entire extent and extending around the edge face of said annular member and being sealed to said edge face, the bottom face of said annular member lying beyond said glass.

2. A stem for an electrical space discharge device comprising a glass wall member having a raised boss formed on its outer surface, a metal lead-in conductor sealed through said glass member and said boss, said lead-in conductor having a rod-like external portion of sufficient rigidity to serve as an external contact pin, and a flat annular member formed on said external portion, said annular member having top and bottom faces extending substantially at right angles to the outer surface of said external portion, said top and bottom faces being joined by an edge face of said annular member substantially at right angles to said top and bottom faces, the glass of the outer end of said boss being sealed to said top face throughout substantially its entire extent and extending around the edge face of said annular member and being sealed to said edge face, the bottom face of said annular member lying beyond said glass.

3. A stem for an electrical space discharge device comprising a glass wall member having a plurality of raised bosses formed on its outer surface, a plurality of metal lead-in conductors each sealed through said glass member and a corresponding one of said bosses, said lead-in conductors each having a solid rod-like external portion of sufficient rigidity to serve as an external contact pin, and a flat annular member formed on the external portion of each of said conductors, said annular members each having top and bottom faces extending substantially at right angles to the outer surface of the corresponding external portion of each of said conductors, the top and bottom faces of each of said annular members being joined by an edge face of the corresponding annular member substantially at right angles to the corresponding top and bottom faces, the glass of the outer end of each of said bosses being sealed to the top face of the corresponding annular member throughout substantially its entire extent and extending around the edge face of the corresponding annular member and being sealed to the corresponding edge face, the bottom face of each of said annular members lying beyond said glass.

PERCY L. SPENCER.

REFERENCES CITED

The following references are of record in the file of this patent:

UNITED STATES PATENTS

| Number | Name | Date |
|---|---|---|
| 1,935,942 | Conner | Nov. 21, 1933 |
| 2,106,578 | Schwartzwalder et al. | Jan. 25, 1938 |
| 2 089,044 | Thomas | Aug. 3, 1937 |
| 1,067,024 | Hall et al. | July 8, 1913 |